No. 828,839. PATENTED AUG. 14, 1906.
J. A. CHAMBERS.
COMBINED POT AND TANK FURNACE.
APPLICATION FILED APR. 6, 1905.
3 SHEETS—SHEET 1.
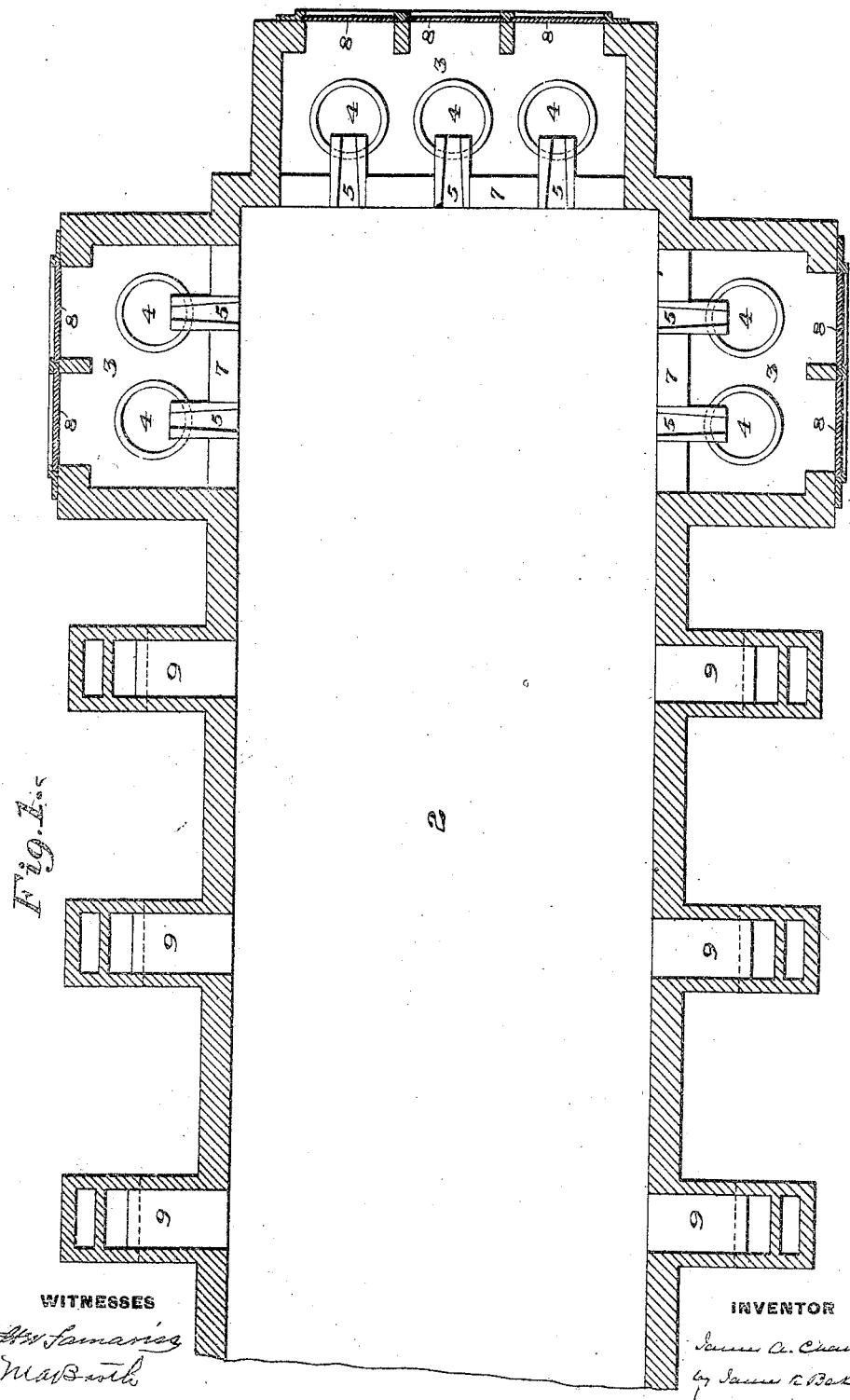
WITNESSES
INVENTOR No. 828,839. PATENTED AUG. 14, 1906.
J. A. CHAMBERS.
COMBINED POT AND TANK FURNACE.
APPLICATION FILED APR. 6, 1905.
3 SHEETS—SHEET 2.
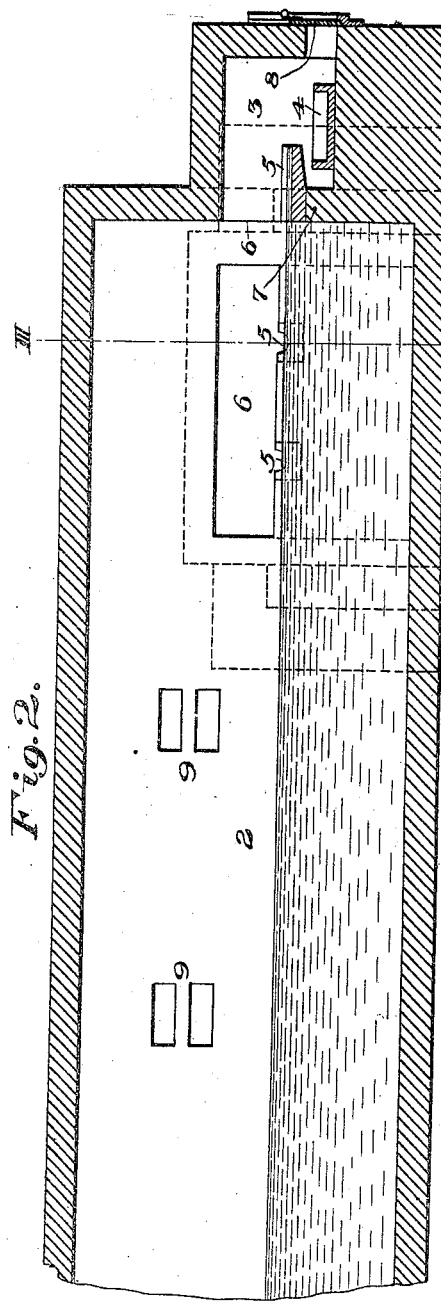
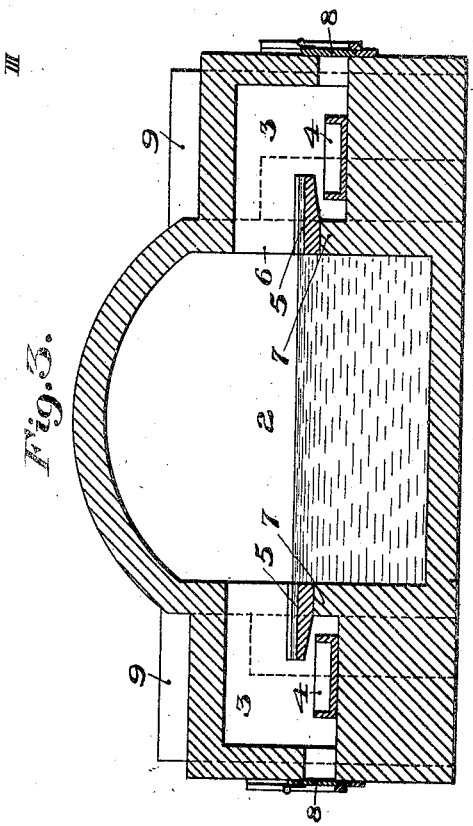
WITNESSES
INVENTOR No. 828,839. PATENTED AUG. 14, 1906.
J. A. CHAMBERS.
COMBINED POT AND TANK FURNACE.
APPLICATION FILED APR. 6, 1905.
3 SHEETS—SHEET 3.
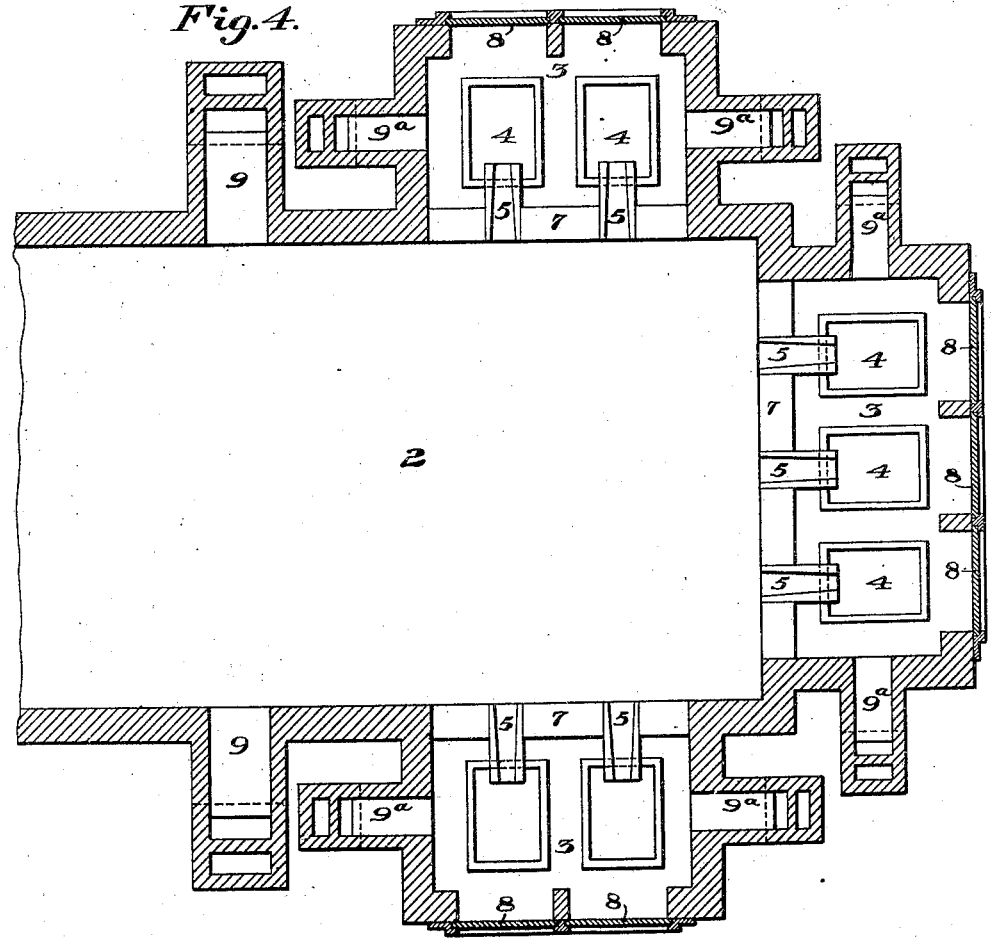
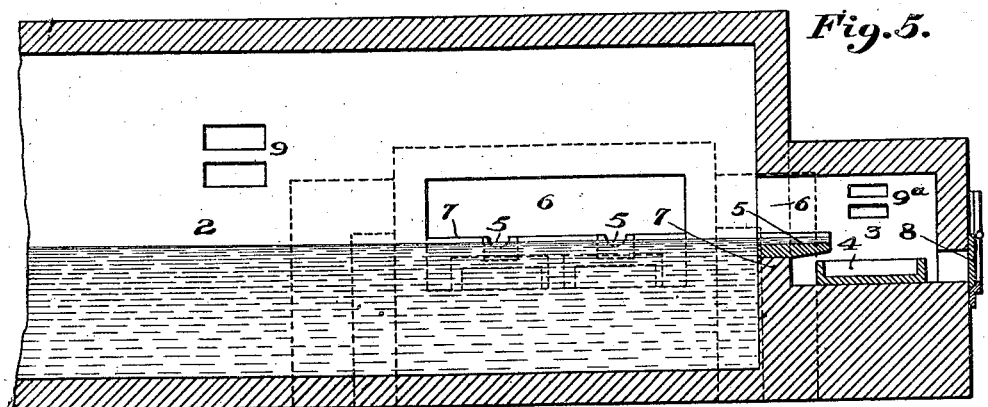

UNITED STATES PATENT OFFICE.

JAMES A. CHAMBERS, OF ALLEGHENY, PENNSYLVANIA, ASSIGNOR, BY MESNE ASSIGNMENTS, TO GEORGE T. OLIVER, OF ALLEGHENY COUNTY, PENNSYLVANIA.

COMBINED POT AND TANK FURNACE.

No. 828,839.     Specification of Letters Patent.     Patented Aug. 14, 1906.

Application filed April 6, 1905. Serial No. 254,149.

*To all whom it may concern:*

Be it known that I, JAMES A. CHAMBERS, of Allegheny, in the county of Allegheny and State of Pennsylvania, have invented a new and useful Combined Pot and Tank Furnace, of which the following is a full, clear, and exact description, reference being had to the accompanying drawings, forming part of this specification, in which—

Figure 1 is a horizontal sectional view illustrating a portion of my furnace. Fig. 2 is a longitudinal vertical sectional view of a portion of the same. Fig. 3 is a cross vertical sectional view on the line III III of Fig. 2. Fig. 4 is a horizontal sectional view illustrating a modified form of furnace, and Fig. 5 is a longitudinal vertical sectional view of the same.

My invention relates to the manufacture of glass; and it is designed to provide means for melting glass in a tank-furnace, causing the molten glass to overflow into pots within a pot-chamber which communicates directly and openly with the tank-chamber, and the heating and fining of the glass in these pots.

In the drawings, 2 represents a portion of a glass tank-furnace, which furnace at the end opposite to that where the batch is fed in is provided with one or more pot-chambers 3, which open out of the tank-chamber and at their lower portion are separated therefrom by the bridge-wall 7. In these pot-chambers are one or more pots 4. Leading from the tank-chamber 2 over or through the bridge-wall 7 to a point within the pot-chambers 3 are overflow-troughs 5, which are so arranged as to permit the molten glass to overflow into the pots 4. The opening 6 in the side wall of the tank-chamber between the tank-chamber and the pot-chamber and above the bridge-wall 7 permits the free circulation of the heat from the tank-chamber to the pot-chamber. The outer wall of the pot-chamber is provided with door-openings which are adapted to be closed by the vertically-sliding doors 8. In the drawings I have shown three pot-chambers, one at the end of the tank and one at each side thereof. I do not desire, however, to limit myself to this number. On each side of the tank are regenerative heating-flues 9, which furnish heat to the tank-chamber in the usual manner. In certain cases should the opening 6 above the bridge-wall 9 fail to furnish sufficient heat to the pot-chamber or where a greater heat is required in the pot-chamber than is supplied from the tank-furnace I add a regenerative flue $9^a$, (shown in Figs. 4 and 5 of the drawings,) which flue opens directly into the pot-chamber.

The operation is as follows: The molten glass as it melts in the tank is allowed to overflow from the tank through the overflow-troughs into the pots in the pot-chamber, where it becomes refined and settled. When the pot is filled and the glass is fined, the pot is removed from the pot-chamber and the glass is poured on the casting-table, where plate or rough glass is to be made. For making window-glass the pot is removed from the pot-chamber and is set in an opening in the top of the heating-kiln, where the glass is drawn from the pot into cylinders. The empty pot is then returned to the pot-chamber to be refilled and the operation is repeated. By using a number of pots the operation may be continuous.

The advantages of my invention result from the construction herein described that enables the practical use of pots instead of ladles, as where ladles are employed in the manufacture of window-glass the consequent disturbance of the glass injures the quality and causes the production of an inferior grade. By the use of my apparatus this disturbance is avoided, a superior quality of glass is produced, and the services of the ladler is dispensed with. In the manufacture of plate-glass all the advantages of the use of pots is preserved, together with the advantages of melting the glass in a tank, and there is also a great saving in pots and fuel, as well as the production of a superior quality of glass.

The pots in the pot-chamber may be of any desired size and shape according to the class of the article to be manufactured.

Having thus described my invention, what I claim, and desire to secure by Letters Patent, is—

1. A tank-furnace having a tank-chamber, one or more pot fining-chambers in direct and open communication with said tank-chamber and having closed outer walls, an overflow leading from the tank to the pot fining-chamber and adapted to discharge the molten glass into pots within the same.

2. A tank-furnace having a tank-chamber, one or more pot fining-chambers in direct and open communication with said tank-chamber and having closed outer walls, and an overflow leading from the tank to the pot in the pot fining-chamber.

3. A tank-furnace having a tank-chamber, one or more pot fining-chambers in direct and open communication with said tank-chamber and having closed outer walls, a heating-flue communicating directly with the pot fining-chamber, and an overflow leading from the tank to the pot in the pot-chamber.

In testimony whereof I have hereunto set my hand.

JAMES A. CHAMBERS.

Witnesses:
GEO. B. BLEMING,
CARRIE E. EGGERS.